(12) United States Patent
Evans

(10) Patent No.: US 6,501,024 B1
(45) Date of Patent: Dec. 31, 2002

(54) TERMINATION FOR ELECTRICAL CABLE

(75) Inventor: Ian Richard Evans, Leatherhead (GB)

(73) Assignee: Pirelli Cables (2000) Limited, London (GB)

( * ) Notice: Subject to any disclaimer, the term of this patent is extended or adjusted under 35 U.S.C. 154(b) by 0 days.

(21) Appl. No.: 09/869,829

(22) PCT Filed: Jan. 7, 2000

(86) PCT No.: PCT/US00/00295

§ 371 (c)(1),
(2), (4) Date: Oct. 5, 2001

(87) PCT Pub. No.: WO00/41285

PCT Pub. Date: Jul. 13, 2000

(30) Foreign Application Priority Data

Jan. 7, 1999 (GB) ............................................... 9900190

(51) Int. Cl.[7] .......................... H01B 13/00; H02G 15/02
(52) U.S. Cl. ......................................... 174/76; 174/73.1
(58) Field of Search ................................ 174/74 R, 76, 174/75 R, 75 D, 142, 19, 73.1

(56) References Cited

U.S. PATENT DOCUMENTS

| | | | | |
|---|---|---|---|---|
| 3,446,741 A | | 5/1969 | Hervig et al. | |
| 3,996,081 A | * | 12/1976 | Nakata | 156/48 |
| 4,204,083 A | * | 5/1980 | Isotton | 174/11 BH |
| 4,327,245 A | * | 4/1982 | Metra | 174/19 |
| 4,418,240 A | | 11/1983 | Chazelas | |
| 4,607,134 A | * | 8/1986 | Wikmar | 174/19 |
| 4,757,159 A | * | 7/1988 | Dejean | 174/73.1 |
| 4,943,685 A | | 7/1990 | Reynaert | |
| 5,130,495 A | * | 7/1992 | Thompson | 174/142 |

FOREIGN PATENT DOCUMENTS

EP        0 005 387        11/1979

* cited by examiner

Primary Examiner—Chau N. Nguyen
(74) Attorney, Agent, or Firm—Finnegan, Henderson, Farabow, Garrett & Dunner, L.L.P.

(57) ABSTRACT

A termination for an electrical power cable includes a load carrying conductor, the termination including an insulating outer member through which the load carrying conductor, or an extension of it, runs substantially longitudinally, and means for controlling electrical stress concentrations within the outer member. Residual space within the outer member is occupied by electrically insulating solid granules. Interstices between the granules are filled with electrically insulating fluid.

17 Claims, 1 Drawing Sheet

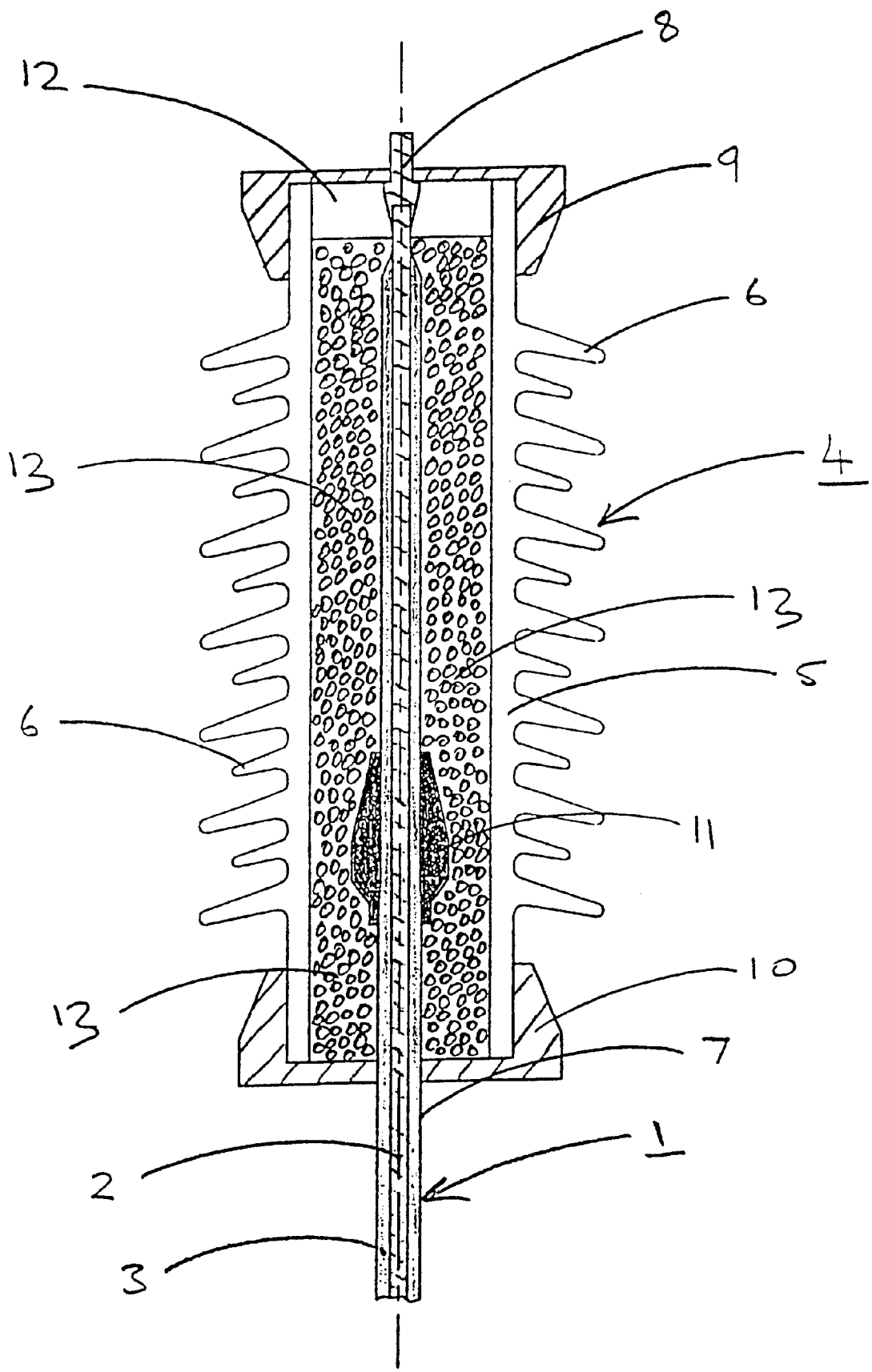

TERMINATION FOR ELECTRICAL CABLE

FIELD OF THE INVENTION

This invention relates to terminations for electrical power cables, for example, operating at voltages in the range from about 35 kilovolts to 500 kilovolts or above.

BACKGROUND

When an electrical power cable is connected to an overhead line, a transformer, switchgear, or other equipment, a suitable termination is required to manage the transition of the load-carrying conductor from the environment of the cable in which it is surrounded by high-quality, solid, insulating material of high electrical strength with electrical stress geometry strictly controlled by a concentric earth screen to one in which insulation is mainly provided by air at relatively low stress concentrations and uncontrolled geometry, while protecting the cable end from contamination, and, where applicable, from leakage of insulating fluids.

Typically, these terminations comprise tubular member, usually of ceramic insulating material, to provide adequate spacing from the high voltage at the end of to earth potential at the screen of the cable. The cable conductor, or an extension of it, runs down the central longitudinal axis of the tubular member, with a stress cone or other means provided in the annular space between the conductor and the tubular member for controlling electrical stress concentrations. Resilient mechanisms may also be provided to ensure that interfaces are under pressure.

While these components fill most of the space inside the tubular member, there are still residual spaces which need to be filled with a material having better electrical properties—primarily breakdown strength, that is the electrical stress concentration at which ionisation occurs leading ultimately to electrical breakdown—than air, to reduce the risk of electrical breakdown at exposed surfaces. Typically, a suitable insulating fluid such as silicone oil or a compressed gas (for example sulfur hexafluoride) are used, but this increases the cost of making the terminations. It has also been known to use large, moulded, polymer shapes to occupy most of the space.

SUMMARY OF THE INVENTION

According to the present invention, there is provided a termination for an electrical power cable including a load carrying conductor, the termination comprising an insulating outer member through which the load carrying conductor, or an extension of it, runs substantially longitudinally, and means for controlling electrical stress concentrations within the outer member, characterised in that residual space within the outer member is occupied by electrically insulating solid granules and interstices between the granules are filled with electrically insulating fluid.

BRIEF DESCRIPTION OF THE DRAWINGS

FIG. 1 provides a cross-sectional representation of an electrical cable termination according to an exemplary embodiment of the present invention.

DETAILED DESCRIPTION OF THE INVENTION.

By "granules", there is meant particles having a greatest diameter in the range 0.5 to 8 mm and an aspect ratio not greater than 3.

The granules are preferably of a polymeric material that does not dissolve or swell unduly in the insulating fluid, for example, low density polyethylene, medium density polyethylene, high density polyethylene, polypropylene, ethylene polypropylene rubber or silicone rubber. Alternatively beads of glass, ceramic or epoxy resin could be used.

The invention can bring significant cost savings due to the lower cost per unit volume of the granules compared to that of the insulating fluid, and, as the use of granules removes the requirement for moulding, is less expensive to produce than moulded shapes.

In addition, whan granules of higher grade low density polyethylene are used in silicone oil, this can reduce the electrical stress in the fluid due to the lower relative permittivity of the granular material when compared to that of the fluid. Because of this lower electrical stress, higher stress cable designs can be accommodated. As the polymer granules will expand at a lesser rate than the silicone fluid, pressures within the termination will remain lower at high temperatures, which will reduce the risk of leakage. In addition, the polymer granules have a better thermal conductivity than silicone fluid, and hence help reduce the temperature within the terminations, which may improve the service life of the termination.

The invention will now be described, by way of example only, with reference to the accompanying drawing, which is a schematic cross-section of a termination for a supertension power cable An electrical cable 1, for carrying loads of between 66 kilovolts and 500 kilovolts (or above), comprises a load carrying conductor 2, and insulation 3. A termination 4 for the cable comprises a substantially tubular member 5, made of a ceramic insulating material. The tubular member 5 has a number of radially extending flanges 6, commonly referred to as "sheds", to increase the length of the surface leakage path. The cable 1 is stripped back from the top end, exposing the insulation 3 to a position part way up the termination; an earth screen 7 continues on the outside of the insulation from this position. The cable conductor 2 runs along the central axis of the tubular member 5 and enters a connector stalk 8 which passes through a top plate 9. The earth screen 7 passes through a baseplate 10 and finishes under the back of a stress cone 11. The top end of the tubular member 5 may enclose an air gap 12 to accommodate expansion.

The structure of the termination as described so far is that of a known termination, and, as such, its operation is already known to persons skilled in the art; except in so far as it is relevant to the present invention, the termination will not be described in any further detail herein.

The remaining space 13 in the interior of the tubular member 5 are then filled with granules of clean, contaminant free, low density polyethylene, with the interstices between the granules being filled with silicone oil. Ideally the granules would be spherical for easy flow and efficient filling, but granules as marketed for feeding to extruders or moulding machines are satisfactory and more economical: these vary in shape depending on the design of the granulator and the speed at which it is operated, and may be roughly cylindrical or quite irregular. The granules used in the example are irregular in shape and typical granules have mutually perpendicular dimensions averaging about 4.4 by 4.0 by 2.5 mm (aspect ratio 1.8).

In making the termination, the residual spaces are preferably first filled with the granules and then the interstices between the granules filled with the silicone fluid.

As will be understood by persons skilled in the art, various modifications are possible within the scope of the present invention, for example, the use of granules with an insulating fluid can be applicable to other forms of terminations for electrical power cables.

What is claimed is:

1. A termination for an electrical power cable including a load carrying conductor, the termination comprising an insulating outer member through which the load carrying conductor, or an extension of it, runs substantially longitudinally, and means for controlling electrical stress concentrations within the outer member, residual space within the outer member being occupied by electrically insulating solid granules and interstices between the granules being filled with electrically insulating fluid.

2. A termination as claimed in claim 1, wherein the solid granules are a polymer.

3. A termination as claimed in claim 2, wherein the polymer is polyethylene.

4. A termination as claimed in claim 2, wherein the polymer is polypropylene.

5. A termination as claimed in claim 2, wherein the polymer is ethylene-propylene rubber.

6. A termination as claimed in claim 2, wherein the polymer is silicone rubber.

7. A termination as claimed in claim 1 wherein the granules are beads of glass, ceramic or epoxy resin.

8. A termination as claimed in any one of claims 1–7 wherein the granules comprise spherical granules.

9. A termination as claimed in any one of claims 1–7 wherein the granules comprise cylindrical granules.

10. A termination as claimed in any one of claims 1–7 in which the granules are irregular in shape.

11. The cable termination as claimed in claim 1, wherein said granules and insulating fluid fill said residual space such that an air gap is provided to accommodate expansion.

12. A termination for an electrical power cable, comprising:

a load carrying conductor;

a hollow member having an interior space and defining a longitudinal direction;

at least a portion of said load carrying conductor being received in said interior space and extending in said longitudinal direction;

an electrical stress control device within said interior space; and a medium at least substantially filling said interior space about said portion of said load carrying conductor, said medium comprising electrically insulating solid granules and an electrically insulating fluid that fills interstices between said granules.

13. The cable termination as claimed in claim 12, wherein said medium fills said interior space such that an air gap is provided to accommodate expansion.

14. The cable termination as claimed in claim 12, wherein each of the electrically insulating solid granules has an aspect ratio of not greater than about 3.

15. The cable termination as claimed in claim 12, wherein each of the electrically insulating solid granules has a greatest dimension in the range of 0.5 mm to 8 mm.

16. A cable termination comprising:

an electrical cable including a load carrying conductor wherein said load carrying conductor is exposed at an end of the cable;

a hollow member having an interior space and defining a longitudinal direction, said exposed load carrying conductor being received in said interior space and extending in said longitudinal direction;

an electrical stress control device within said interior space; and a filling medium at least substantially filling said interior space and in contact with said exposed load carrying conductor, said filling medium comprising electrically insulating solid granules and an electrically insulating fluid that fills interstices between said granules, wherein said granules have a greatest dimension in a range of 0.5 mm to 8 mm and an aspect ratio of not greater than 3.

17. The cable termination as claimed in claim 16, wherein said filling medium fills said interior space such that an air gap is provided to accommodate expansion.

* * * * *